United States Patent Office 3,284,498
Patented Nov. 8, 1966

3,284,498
SUBSTITUTED BENZENE SULFONYL UREA
Lee C. Cheney, Fayetteville, N.Y., and Yvon Gaston Perron, Ville d'Anjou, Quebec, Canada, assignors to Bristol-Myers Company, New York, N.Y., a corporation of Delaware
No Drawing. Filed Jan. 7, 1964, Ser. No. 336,144
1 Claim. (Cl. 260—553)

This invention relates to novel compounds and to methods for their preparation. The invention relates more specifically to 1-cyclohexyl-3-(p-trifluoromethyl-benzenesulfonyl)-urea and to an intermediate which is useful in the preparation thereof.

This application is a continuation-in-part of our prior copending application Serial No. 794,832, now abandoned, field February 24, 1959.

It is the object of the present invention to provide a new hypoglycemic compound which is useful upon oral administration in the treatment of certain diabetic patients. It is a particular object of the present invention to provide a new hypoglycemic compound having a low order of toxicity and improved clinical effectiveness upon oral administration in the treatment of diabetic patients. It is also an object of the present invention to provide such a compound which is rapidly absorbed from the grastrointestinal tract, which is not deactivated in the gaastrointestinal tract and which is capable of providing a prolonged hypoglycemic effect. It is also an object of the present invention to provide a method for the preparation of the hypoglycemic compound of this invention and to provide a compound which is a useful intermediate in the preparation of such a hypoglycemic compound.

The objects of the present invention have been attained by the provision, according to the present invention, of the novel hypoglycemic agent, 1-cyclohexyl-3-(p-trifluoromethyl-benzenesulfonyl)urea which has the following structural formula

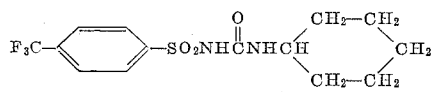

There is also provided by the present invention the new compound having the formula

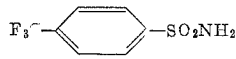

This new compound, 4-trifluoromethylbenzenesulfonamide, is a useful intermediate in the preparation of the hypoglycemic compound of this invention and is prepared by removing the amino group from 2-amino-4-trifluoromethylbenzenesulfonamide as is specifically illustrated by Examples I and II.

The compound, 4-trifluoromethylbenzenesulfonamide, is also useful as a carrier or regulator in combination with an organic cyanide brightener (e.g., acetonitrile) in a bath for the electrodeposition of nickel. Thus, a bath for bright nickel plating may comprise 240 g. of nickel sulfate, 37.5 g. of nickel chloride, 37.5 g. of boric acid, 0.25 g. of sodium lauryl sulfate, 0.28 g. of acetonitrile, 1.0 g. of 4-trifluoromethylbenzenesulfonamide, and water q.s. to make 1 liter of solution. Such a bath results in a nickel deposit which is bright and not too brittle. The new compound 4-trifluoromethylbenzenesulfonamide may also be used as a stomach insecticide.

The hypoglycemic compound of the present invention is prepared by reacting the novel intermediate of the present invention, i.e. 4-trifluoromethylbenzenesulfonamide, or an alkali salt thereof, with cyclohexyl isocyanate, or with a reactive functional derivative of an alkyl or cycloalkyl carbamic acid of the general formula

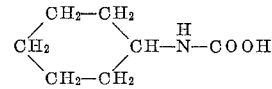

the reaction in each method being performed, if necessary, in the presence of a condensing agent such as, e.g. triethylamine, pyridine and alkali alcoholates. If the N - cyclohexyl - N(p-trifluoromethylbenzenesulfonyl)guanidine is obtained from the latter procedure, the desired substituted urea product may be obtained by hydrolyzing the substituted guanidine. Thus, 1-cyclohexyl-3-(p-trifluoromethylbenzenesulfonyl)urea may be prepared, by reacting n-cyclohexyl isocyanate in a solution of dimethylformamide with 4-trifluoromethylbenzenesulfonamide in a solution of triethylamine, adding the reaction mixture to an aqueous acetic acid solution and collecting and purifying the resulting 1-cyclohexyl-3-(p-trifluoromethyl-benzenesulfonyl)urea. In another method of preparing the hypoglycemic compound of the present invention, which method is specifically illustrated in Example III, below, 4-trifluoromethylbenzenesulfonamide and anhydrous potassium carbonate are reacted with ethyl chloroformate in an acetone reaction medium. The product of this reaction is then isolated and reacted with cyclohexyl amine, and the product, 1-cyclohexyl-3-(p-trifluoromethylbenzenesulfonyl)urea, is collected and purified. Suitable functional derivatives of the cyclohexyl carbamic acid may also be used in the preparation of the hypoglycemic compounds of the invention; the esters of cyclohexyl carbamic acid are suitable for this use. Other suitable functional derivatives of cyclohexyl carbamic acid are the halides and amides thereof. The nitriles (RNHCN) are also useful and when such nitriles are used, the guanidine derivatives of the 4-trifluoromethyl-benzenesulfonamide intermediates are obtained and are then converted to the desired product of hydrolysis. We have also found that in place of the cyclohexyl isocyanate we may use azides, N-bromo-amides and N-chloro-amides of cyclohexyl carboxylic acid which are easily decomposed to produce the corresponding cyclohexyl isocyanates.

The hypoglycemic compound of the present invention may also be prepared by reacting a cyclohexyl primary amine with p-trifluoromethylbenzenesulfonyl isocyanate or with a suitable reactive functional derivative, as mentioned above, of p-trifluoromethylbenzenesulfonyl carbamic acid in the presence of a suitable basic condensing agent such as triethylamine. In another method of preparation the p-trifluoromethylbenzenesulfonyl halides, e.g. chloride or bromide, are reacted with ether of the isoform of cyclohexyl urea and partially hydrolyzing the resulting N-cyclohexyl-N(p-trifluoromethylbenzenesulfonyl) iso-urea ether so obtained to form the desired hypoglycemic agent.

The compounds of the present invention are administered orally in the form of capsules or tablets, or, if desired, as solutions or suspensions. Dosage is, of course, at the discretion of the prescribing physician. Representative daily dosages range from about 100 mg. to about 1 g.; ordinarily the daily dosage is less than 500 mg. and preferably within the range of from about 100 to 250 mg.

It is well known that the replacement of one group for another group on a compound having pharmacological properties may vastly alter the characteristics of that compound. For example, replacement of the p-methyl group on 1-n-butyl-3-(p-methylbenzenesulfonyl)urea with a trifluoromethyl group results in a significant decrease in hypoglycemic activity and in duration of hypoglycemic activity. Similarly, replacement of the p-chloro group on 1-n-propyl-3-(p-chlorobenzenesulfonyl)urea with a trifluoromethyl group results in a significant decrease in hypoglycemic activity and in duration of hypoglycemic activity. The fact that 1-cyclohexyl-3-(p-trifluoromethylbenzenesulfonyl)urea would be a potent hypoglycemic agent was therefore completely unpredictable.

The novel hypoglycemic compound of this invention is not inactivated by metabolic processes in the same manner as, for example, compounds in which the p-trifluoromethyl group is replaced with a methyl group.

The compounds of this invention and methods of their preparation are illustrated without limitation by the following specific examples.

*Example I.—Preparation of 2-amino-4-trifluoromethylbenzenesulfonamide*

Step 1:

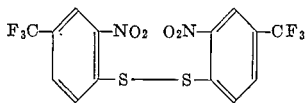

Bis-(2-nitro-4-trifluoromethylphenyl)disulfide

Sodium sulfide (0.228 mole, 29.2 g. of Hooker 61% aqueous sodium sulfide), sulfur (0.227 mole, 7.26 g.) and 27 ml. water in 450 ml. 95% ethanol were dissolved by heating on the steam-bath. This warm solution was then added dropwise over 90 minutes to a refluxing solution of 4-chloro-3-nitrobenzotrifluoride (Antara, 100 g., 66 ml., 0.444 mole)) in 140 ml. 95% ethanol. The product, bis - (2 - nitro - 4 - trifluoromethylphenyl)disulfide, soon began to separate as a yellow solid and, after refluxing for an additional sixty minutes and then cooling in an ice bath, was collected by filtration, air-dried and found to weigh 93 g. and to melt at 148–152° C. with some prior shrinking.

Two recrystallizations from acetic acid gave product melting at 160.5–163.5° C. (corrected).

Step 2:

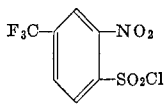

2-nitro-4-trifluoromethylbenzenesulfonyl chloride

Bis - (2 - nitro - 4 - trifluoromethylphenyl)disulfide (300 g., 0.675 mole) was suspended in a mixture of 1 liter glacial acetic acid and 100 ml. water and chlorine was bubbled into the stirred mixture for two hours. During this time the flask became quite warm and the reaction mixture changed from a thick suspension to an easily stirred thin suspension. The mixture was stirred for an additional hour and then warmed on the steam bath for thirty minutes. Chlorine was then bubbled in for 30 minutes and then the mixture was heated on the steam bath for one hour. After standing overnight, the reaction mixture was poured into 3 liters of water and crushed ice. An oil separated to the bottom. The product, 2-nitro-4-trifluoromethylbenzenesulfonyl chloride, was extracted with a total of 1 liter of toluene in four portions and the toluene solution of this product was dried for three hours in the cold room over anhydrous sodium sulfate. The drying agent was then removed by filtration, washing with some additional toluene to give a total volume of 1200 ml.

Step 3:

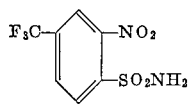

2-nitro-4-trifluoromethylbenzenesulfonamide

One-half (600 ml.) of the above solution in toluene of 2 - nitro - 4 - trifluoromethylbenzenesulfonyl chloride was maintained at 0–4° C. and treated with anhydrous ammonia for two hours, precipitating 2-nitro-4-trifluoromethylbenzenesulfonamide as a yellow solid. After standing at room temperature for three days, the mixture was cooled and the product was collected by filtration and dissolved by stirring in 250 ml. 10% aqueous sodium hydroxide. This solution was filtered and then acidified with cooling with 6 N hydrochloric acid to give the product as a crystalline precipitate which was collected by filtration, recrystallized from a mixture of 120 ml. water and 100 ml. 95% ethanol (filtering the hot solution) to give 32.5 g. light yellow product melting at 161–165° C.

A sample was recrystallized from toluene and dried in vacuo over $P_2O_5$ at 111° C., M.P. 165–167° C.

*Analysis.*—Calculated for $C_7H_5F_3N_2O_4S$: C, 31.1; H, 1.865; N, 10.37. Found: C, 31.44; H, 2.05; N, 10.00.

Step 4:

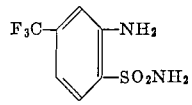

2-amino-4-trifluoromethylbenzenesulfonamide

2 - nitro - 4 - trifluoromethylbenzenesulfonamide (5 g., 0.0185 mole) and 5 ml. (5.24 g., 0.874 mole) acetic acid in 150 ml. water were heated on the steam bath and iron filings (6 g., 0.1075 mole) were added to the hot mixture in two approximately equal portions five minutes apart. After stirring on the steam bath for three hours, 100 ml. 95% ethanol were added and the solution was boiled, filtered hot and the hot filtrate was made neutral with a saturated solution of sodium carbonate, causing a flocculent precipitate to separate. The mixture was heated to boiling, filtered and cooled in an ice bath, precipitating white crystalline 2-amino-4-trifluoromethylbenzenesulfonamide which was air-dried and found to weigh 3 g. and to melt at 140–144° C.

A sample was recrystallized from water and a few drops of 95% ethanol and dried in vacuo over $P_2O_5$ at 111° C., M.P. 143–146° C.

*Analysis.*—Calculated for $C_7H_7F_3N_2O_2S$: C, 35.0; H, 2.94; N, 11.66. Found: C, 35.88, 35.18; H, 3.3, 3.04; N, 11.88.

*Example II.—Preparation of 4-trifluoromethylbenzenesulfonamide*

26.9 g. (0.112 mole) of 2 amino-4-trifluoromethylbenzenesulfonamide is added to a mixture of 30 ml. of concentrated sulfuric acid and 200 ml. of ethanol which had previously been cooled to 0° C. The mixture is cooled to −10° C. and maintained at −10° C. during the step-wise addition of 31 g. (0.448 mole) of sodium nitrite over a period of about 10 minutes. The reaction mixture is maintained at a temperature not exceeding 5° C. during the addition of 150 ml. water. The reaction mixture is maintained with stirring at 5° C. for one hour and then slowly heated to reflux. The resulting clear orange solution is refluxed for about 75 minutes, cooled to 10° C. and adjusted to pH 10 with 50% aqueous solution of sodium hydroxide. The precipitated salts are filtered off and washed with four 50 ml. portions of ethanol. The filtrate is then neutralized with concentrated hydrochloric acid and an excess of sodium carbonate. The filtrate is then stripped in vacuo and dried at 100° C. for about 48 hours. The dry residue is then cautiously mixed with 47 g. of phosphorous oxychloride and the mixture is refluxed for 20 hours at 170–180° C. The mixture, after refluxing, is mixed with 400 g. of crushed ice. After the ice melts, the aqueous solution is extracted with three 350 ml. portions of carbon tetrachloride. The remaining sludge and water are added to 1.5 liters of concentrated ammonium hydroxide whereupon a crystalline solid which is soluble in water is formed, and discarded. The combined extracts are stripped of carbon tetrachloride and the product, 4-trifluoromethylbenzenesulfonyl chloride, a dark brown liquid residue, is mixed with 60 g. of ammonium carbonate and transferred to an evporating dish in which it is crushed and thereafter heated for two hours on a steam bath. The resulting powder is then dissolved in 450 ml. of water at 80° C., stirred for about 10 minutes and allowed to stand for several hours at 10° C. The resulting brown crystals having a melting point of 175–177° C., are collected by filtration, decolorized with activated charcoal and recrystallized from an aqueous methanol solution to yield 14.5 g. (58.3% of theoretical yield) of white crystalline (4-trifluoromethylbenzenesulfonamide), M.P. 181–183° C.

*Analysis.*—Calculated for $C_7H_6F_3NO_2S$ (mol. wt. 225.2): C, 37.32%; H, 2.67%. Found: C, 37.32%; H, 2.71%.

*Example III.*—*Preparation of 1-cyclohexyl-3-(p-trifluoromethylbenzenesulfonyl)urea*

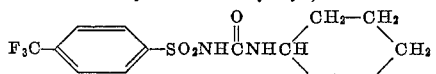

To 25 g. (1.0 mole) of the 4-trifluoromethylbenzenesulfonamide and 358 g. (2.6 mole) of anhydrous potassium carbonate in 1.2 liter of acetone is added with stirring 163 g. (1.32 mole) of ethyl chloroformate over a period of three hours. After cooling in an ice bath the reaction mixture is filtered and the filtrate is concentrated under reduced pressure. The residue is taken up in three liters of water, the resulting solution is filtered and acidified slowly with cooling to yield a white crystalline carbamate.

To 29.7 g. (0.1 mole) of the dried carbamate thus obtained is added 29.0 g. (0.3 mole) of cyclohexylamine. The mixture is heated in benzene on a steam bath for about 10 minutes whereupon solution is effected. The benzene is then stripped from the mixture at 120–140° C. under reduced pressure and the residue is heated on a wax bath for about three hours at 135–140° C. The residue is dissolved in about 175 ml. of boiling isopropanol and the solution is then filtered and the filtrate diluted to 500 ml. with water at about 100° C. The resulting diluted filtrate, which contains the desired product, is allowed to cool and stand overnight and the precipitated crystalline product is thereafter collected by filtration. The crystalline product is then dissolved in 500 ml. of an aqueous solution of sodium carbonate (5%) and the solution is filtered and the insoluble solids washed with two 100 ml. portions of water. The filtrate is acidified and cooled, whereupon the product is precipitated, collected by filtration, and recrystallized from isopropanol-water, yielding pure colorless crystals of 1-cyclohexyl-3-(p - trifluoromethylbenzenesulfonyl)urea having a melting point of 181–183° C.

*Analysis.*—Calculated for $C_{14}H_{17}F_3N_2O_3S$ (mol. wt. 350.36): C, 48.00%; H, 4.90%. Found: C, 47.94%; H, 4.81%.

This product, which may also be called 1-(p-trifluoromethylbenzenesulfonyl)-3-cyclohexylurea, is found upon oral administration to have a low order of toxicity and to be an effective hypoglycemic agent which is rapidly absorbed from the gastrointestinal tract.

Quite surprisingly, the hypoglycemic agent of this invention is much more effective than are structurally similar compounds. Thus, it has been found that the hypoglycemic activity of 1-cyclohexyl-3-(p-trifluoromethylbenzenesulfonyl)urea in normal, fasted rats is much greater than its isomer, 1-cyclohexyl-3-(m-trifluoromethylbenzenesulfonyl)urea, tested under the same conditions. Similarly, the hypoglycemic activity of 1-cyclohexyl-3-(p-trifluoromethylbenzenesulfonyl)urea is significantly greater than 1-n-butyl-3-(p - trifluoromethylbenzenesulfonyl)urea and 1-n-propyl-3-(p-trifluoromethylbenzenesulfonyl)urea. Furthermore, it produces a significant lowering of the blood sugar levels in rats (i.e., a decrease of at least 20%) at only about one-half the dose required for the compound 1-n-butyl-3-(p-methylbenzenesulfonyl)urea to produce a significant lowering of the blood sugar level.

We claim:

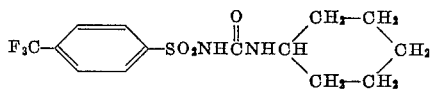

References Cited by the Examiner

UNITED STATES PATENTS

| | | | |
|---|---|---|---|
| 2,141,893 | 12/1938 | Zitscher et al. | 260—505 |
| 2,740,814 | 4/1956 | Cross et al. | 260—556 |
| 2,928,767 | 3/1960 | Gulesich et al. | 260—243 |
| 2,975,212 | 3/1961 | Wagner et al. | 260—253 |
| 3,004,028 | 10/1961 | Dolliver et al. | 260—243 |
| 3,034,955 | 5/1962 | Frick et al. | 260—556 XR |
| 3,095,447 | 6/1963 | Stoll et al. | 260—553 |

FOREIGN PATENTS

| | | |
|---|---|---|
| 965,234 | 6/1957 | Germany. |
| 802,885 | 10/1958 | Great Britain. |

OTHER REFERENCES

Yale, Abstracts of Papers, American Chemical Society, 134th Meeting, pp. 8-0 to 9-0 (Aug. 25, 1958).

Yale, J. Med. and Pharm. Chem., vol. 1, No. 2, pp. 121–133 (April 1959).

Yagupolskii, Zhur. Obsch. Khim., vol. 29, pp. 552–556 (February 1959).

German Auslegerschrift, 1,024,074, Feb. 13, 1958, 260–553 (4 pp. spec.).

JOHN D. RANDOLPH, *Primary Examiner.*

WALTER A. MODANCE, *Assistant Examiner.*